United States Patent [19]

Parra

[11] 4,094,073
[45] June 13, 1978

[54] ANGLE DETECTOR

[75] Inventor: Gilbert T. Parra, Sunnyvale, Calif.

[73] Assignee: The United States of America as represented by the Administrator of the National Aeronautics and Space Administration, Washington, D.C.

[21] Appl. No.: 740,457

[22] Filed: Nov. 10, 1976

[51] Int. Cl.² .............................................. G01C 9/06
[52] U.S. Cl. ..................................................... 33/366
[58] Field of Search ......................................... 33/366

[56] References Cited

U.S. PATENT DOCUMENTS 2,633,028  3/1955  Fillebrown ..................... 33/366 X Primary Examiner—Charles E. Phillips Attorney, Agent, or Firm—Darrell G. Brekke; John R. Manning; Armand McMillan

[57] ABSTRACT

An angle detector for determining a transducer's angular disposition to a capacitive pickup element. The transducer comprises a pendulum mounted inductive element moving past the capacitive pickup element. The capacitive pickup element divides the inductive element into two parts $L_1$ and $L_2$ which form the arms of one side of an a-c bridge. Two networks $R_1$ and $R_2$ having a plurality of binary weighted resistors and an equal number of digitally controlled switches for removing resistors from the networks form the arms of the other side of the a-c bridge. A binary counter, controlled by a phase detector, balances the bridge by adjusting the resistance of $R_1$ and $R_2$. The binary output of the counter is representative of the angle.

9 Claims, 3 Drawing Figures (A) REFERENCE CURRENT SIGNAL (B) COMPARATOR 113 OUTPUT SIGNAL (C) SAMPLING SWITCH 95 CONTROL SIGNAL (D) RESET SWITCH 99 CONTROL SIGNAL (E) FET SWITCH 103 CONTROL SIGNAL (F) FET SWITCH 105 CONTROL SIGNAL (G) INTEGRATOR 87 INPUT (UNBALANCED BRIDGE)

(H) INTEGRATOR 87 INPUT (BALANCED BRIDGE)

(I) INTEGRATOR 87 INPUT (UNBALANCED BRIDGE)

ANGLE DETECTOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to angle detectors and more particularly to an angle detector incorporating a self-balancing bridge.

2. Description of the Prior Art

Wind tunnel testing requires a small detector that can be mounted inside a test airplane model to measure angle of attack or the rotation of the model about a horizontal axis. A device of this type has been described in the paper "Capacitance Pickup Measures Small Forces," J. Dimeff and T. B. Fryer, Electronics, Vol. 30, No. 2, Feb. 1957, pp. 143–145. The detector utilizes a potentiometer-type transducer with a stationary, capacitance-type wiper. A remote potentiometer is connected in parallel with the transducer to form a bridge circuit. When the model is moved, the transducer is moved and an a-c error signal is generated at the capacitance-type wiper. The error signal is amplified and used to drive a servo motor which is coupled to the wiper of the remote potentiometer by means of a gear train. The wiper is slewed in such a direction as to balance the bridge circuit. The angle readout is in two forms: (1) a front panel indication from a mechanical counter driven by the servo-motor gear train; and (2) the analog output of an isolated potentiometer driven by the servo-motor gear train.

BRIEF SUMMARY OF THE INVENTION

Accordingly, it is an object of the present invention to provide an improved angle sensor which dispenses with the use of gear trains, mechanical linkages, and motors.

It is a further object of the present invention to provide such an angle sensor capable of direct digital readout of the detected angle.

The objects of the present invention are achieved by an angle detector including a capacitive pickup element and an inductive element suspended as a pendulum and angularly movable past the capacitive pickup element. The inductive element is divisable into two parts $L_1$ and $L_2$ formed between the electrical center of the pickup element and the two ends of the inductive element and varying with the relative angular displacement of the two elements. A digitally positionable potentiometer electrically shunting the inductive element forms the remaining two parts $R_1$ and $R_2$ of a bridge circuit. An alternating current source connected to the bridge circuit provides an alternating current signal therein so that no current flows from the inductive element to the capacitive pickup element when the bridge circuit is balanced. There is further provided means connected to the capacitive pickup element and responsive to the flow of current thereto from the inductive element for generating an error signal. A phase detector is connected to the error signal generating means for detecting the phase difference between the error signal and the alternating current signal to indicate the phase difference; and means are provided which are responsive to the indicating of the phase difference for digitally positioning the potentiometer to balance the bridge circuit and null the error signal. The digitally positionable potentiometer includes two networks having a plurality of binary weighted resistors and an equal plurality of digitally controllable switches for disconnecting selected ones of the plurality of resistors from the networks; and the positioning means includes a binary counter whose outputs are connected to the control inputs of the digitally controllable switches.

The foregoing as well as other objects, features, and advantages of the present invention will become more apparent from the following detailed description taken in conjunction with the appended drawings.

DESCRIPTION OF THE PREFERRED EMBODIMENT

Figure 1:
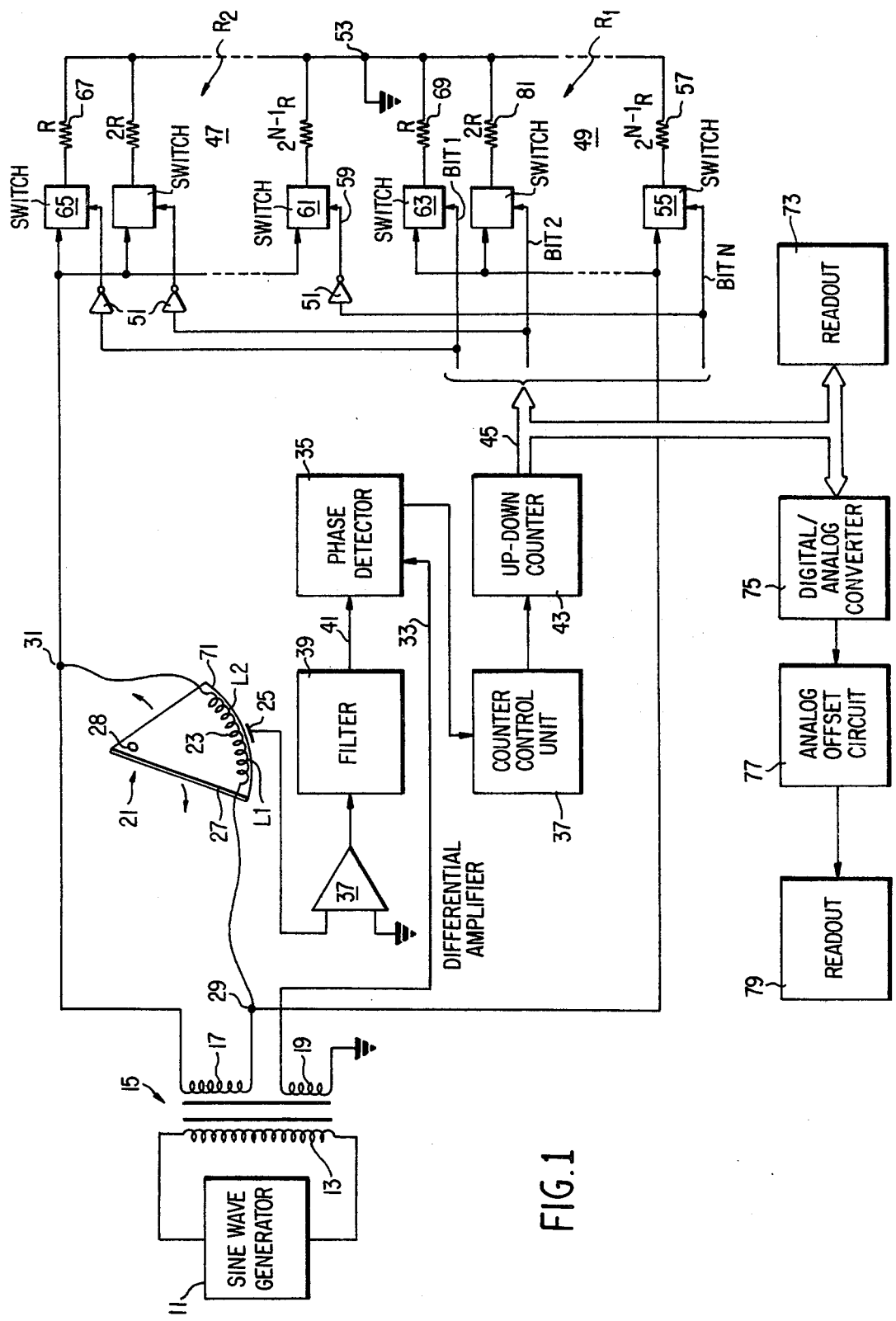
FIG. 1 is a block diagram of a preferred embodiment of the angle detector of this invention.

Referring now to the drawings and more particularly to FIG. 1 thereof, there is shown in block form the angle detector of the present invention. A sine wave generator 11 provides current to the primary winding 13 of transformer 15 which has secondary windings 17 and 19. A transducer 21 generates an a-c signal representative of the transducer's angular disposition to a reference angle (which may be zero degrees or any desired angle). The transducer comprises a pendulum-mounted inductive element 23 and a capacitive pickup element 25. An arcuate inductive element 23 is securely attached to a pendulum 27 which is free to rotate about a pivot 28. The capacitive pickup element 25 is close to inductive element 23 but it does not touch the inductive element. The leads of the inductive element are connected in shunt with the floating secondary winding 17 at nodes 29 and 31. The capacitive pickup element 25 separates the inductive element 23 into parts $L_1$ and $L_2$. A sine wave signal is induced from inductive element 23 to capacitive pickup element 25. The amplitude of the a-c signal induced at pickup 25 is dependent on the relative orientation of pendulum 27. The phase of the induced signal with respect to the reference signal produced at secondary transformer winding 19 will also vary as pendulum 27 is moved about pivot 21. Whereas the output of the transformer winding 17 floats with respect to ground, one lead of transformer 19 is grounded and the other lead 33 is connected to a phase detector 35. Inductive element 23 and capacitive pickup 25 may be thought of as a potentiometer wherein capacitive element 25 serves as the "wiper." The a-c signal induced in capacitive pickup element 25 is amplified in differential amplifier 37 (which has one input grounded) and then fed through a bandpass filter 39 to reduce harmonics and other noise. The phase of the filtered signal on lead 41 is compared with the phase of the reference a-c signal generated at winding 19 by means of phase detector 35. A counter control unit 38, to be described hereinafter, in response to the output of phase detector 35, causes an up-down counter 43 to produce a binary word, symbolic of the count, on the N output leads of the counter. The N leads emanating from the counter are depicted symbolically by bus 45. The first bit is developed on the Bit 1 line, the second bit is generated on the Bit 2 line, etc.

Resistor arrays 47 and 49 each have N resistors varying in resistance from R to $2^{N-1}R$. Connected in series with each resistor is a digitally-controlled switch which may be, for example, a siliconix DG 201 CMOS integrated circuit. Each switch has a control input which is coupled to one of the N lines from counter 43. Inverters 51 are interposed between the N lines and the control inputs of the digitally-controllable switches in resistor array 47. When a logic 1 is transmitted on a counter output line to a switch control input, the switch is closed and the series-coupled resistor is connected between ground, node 53, and one lead of the secondary winding 17. Similarly, when a logic 0 is impressed on the control input, the switch is opened and the resistor is disconnected from the circuit. If a logic 1 were transmitted from the $N^{th}$ line of counter 43, switch 55 would close and connect resistor 57 between junction 29 and junction 53 (ground). Because of the presence of inverter 51, the control input 59 of switch 61 would see a logic 0 and switch 61 would be open. Likewise, if a logic 0 were generated on the Bit 1 line from counter 43, switch 63 would open and switch 65 would close. With the closing of switch 65, resistor 67 would be connected between ground and junction 31. Let $R_1$ be the total resistance of resistor array 49 between junctions 29 and 53, and let $R_2$ be the total resistance of resistor array 47 between junctions 31 and 53. If a logic 1 were only generated on line Bit N (logic 0's on the remaining lines) the resistance of $R_1$ would be greater than it would be if logic 0's were generated on all the output lines of counter 43. If logic 1's were generated on all of the bus 45 lines, all of the digitally-controlled switches of resistor array 49 would be closed, all of the N resistors therein would be connected in shunt and $R_1$ would be less than R (the resistance of resistor 69). With all logic 0's on the bus 45, the digitally-controlled switches of resistor array 47 would be open, all of the N resistors would be disconnected and $R_2$ would be infinite. It is thus apparent that the resistor arrays work in a push-pull fashion-when $R_1$ goes down, $R_2$ goes up and vice versa. It is also apparent that the resistance of the binary-weighted resistor arrays can vary from a very, very small resistance to an infinite resistance depending on the state of the counter. The two push-pull resistor arrays perform as a digitally-positioned potentiometer, with the "wiper" being connected to signal ground. As the output of the angle transducer 21 is sensed with respect to ground (by amplifier 37), the error signal at pickup element 25 can be nulled out by appropriately slewing the digitally-positioned potentiometer (varying $R_1$ and $R_2$).

Components $L_1$, $L_2$, $R_1$ and $R_2$ form a bridge circuit. In order to balance the bridge, it is necessary to adjust $R_1$ and $R_2$ so that the output a-c signal from amplifier 37 is 90° out of phase with the reference a-c signal from transformer winding 19. For example, when capacitive pickup element 25 is near to end 71 of inductive element 23, $R_2$ must be very small with respect to $R_1$. Counter 43 is turned on by counter control unit 38 whenever the output signal from amplifier 37 is not in quadrature with the reference signal. Once the counter is turned on it generates a binary word which slews the digitally-controlled potentiometer so that it will balance the bridge and null the servo system. As soon as the effective resistances of digitally controlled resistor arrays 47 and 49 balance the bridge circuit, control unit 37 stops counter 43. The binary output of counter 43 is representative of the angle seen by transducer 21 and the output is fed to readout 73 and digital-to-analog converter 75 by bus 45. Readout 73 may be a recorder, a computer, a visual presentation etc. A conventional analog offset circuit 77 is coupled between the output of digital-to-analog converter 75 and a second readout 79. Readout 79 may be a recorder, a computer or a visual presentation. For example, readout 79 could be a digital panel meter such as the Model 37 SD2A2 manufactured by Gralex Industries Farmingdale, New York. This meter provides a BCD output signal as well as a four-digit visual presentation. The output signal at readout 75 has a zero reference that is centered within the range of operation of the servo. By adjusting analog offset circuit 75 (which may be a summing op-amp circuit), an operator can set any level within the ± full scale output of the DAC as the reference for the analog output. By means of this circuit the operator can set the readout to zero at any point within the servo range.

The resolution of the angular measurement servo system is directly proportional to the number of resistors employed in each binary-weighted resistor array. The number of resistors determines the number of discrete positions for the digital servo. The resolution is defined as follows:

$$\text{Resolution} = \frac{\text{Sensor Range}}{2^N}$$

wherein N is the number of binary weighted resistors per array. For example, for an angle measuring system having a range of 60° and 11 resistors per array, the servo resolution would be $$\frac{60°}{2^{11} \text{ counts}} = \frac{60°}{2048 \text{ counts}} = \frac{.03°}{\text{count}}$$

Further, in such a system resistor 81 would have twice the resistance of resistor 69, resistor 57 would have 1024 times the resistance of resistor 69, etc.

Figure 2:
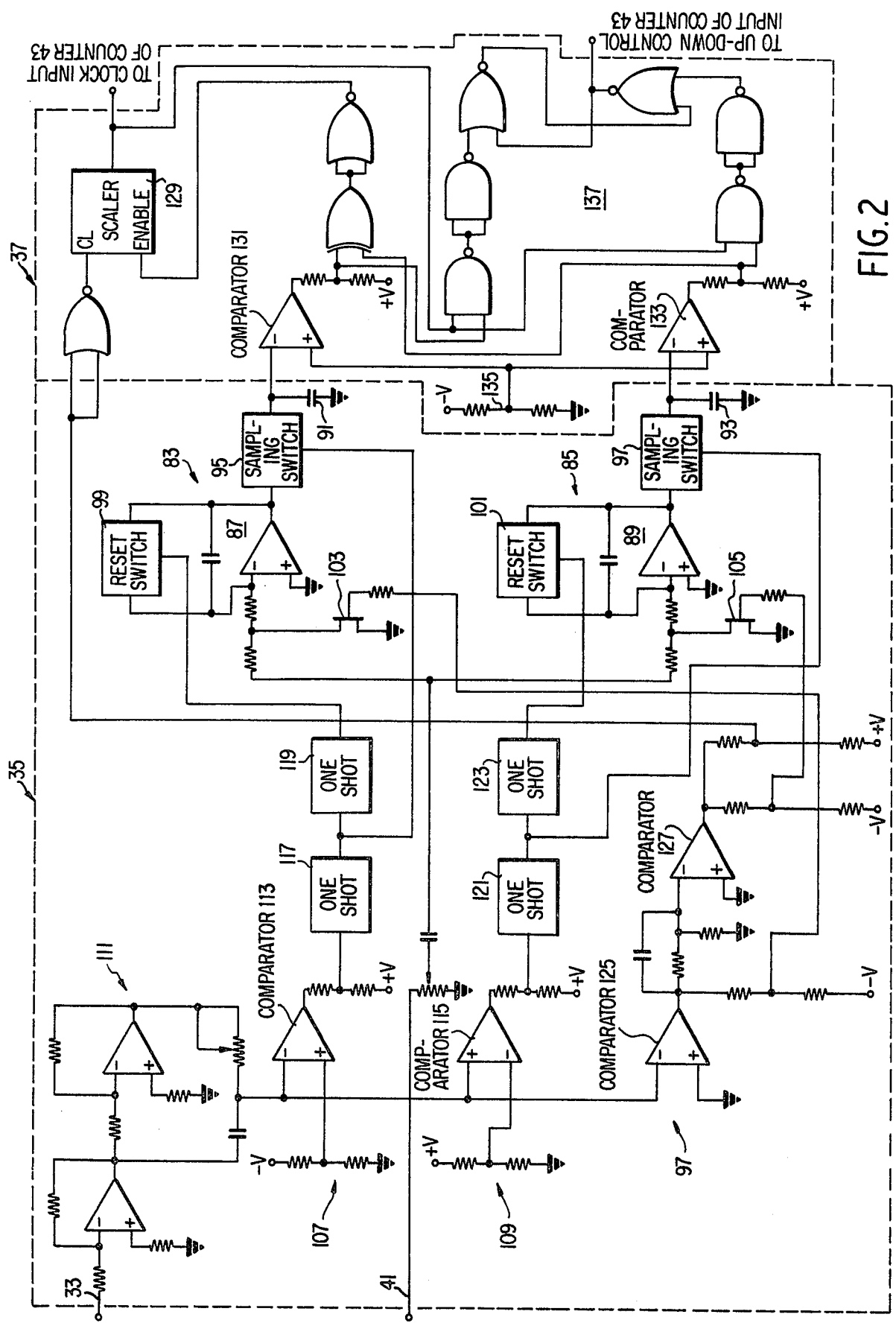
FIG. 2 is a schematic circuit diagram of the phase detector and counter control circuits.
Figure 3:
FIGS. 3(a) – (i) is a series of waveforms produced at various points in the schematic circuit diagram of FIG. 2.
Figure 3:
Figure 3:
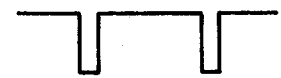
Figure 3:
Figure 3:
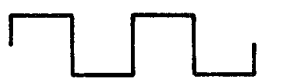
Figure 3:
Figure 3:
Figure 3:
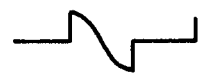
Figure 3:

Referring now to FIG. 2 and FIG. 3, the phase detector 35 and the counter control unit 38 will be described in greater detail. Enclosed by a broken line 35 in FIG. 2 are the circuit elements of the phase detector 35 indicated in block form in FIG. 1. The phase detector includes two sample-and-hold circuits 83, 85 which are alternately activated during half-cycles of the reference a-c signal from the transformer winding 19. The waveform of the reference a-c signal is shown in FIG. 3(a). One circuit 85 samples the error signal waveform during the positive excursions of the reference current signal and the other circuit 83 samples the error signal waveform during the negative excursions of the reference a-c signal. Each sample-and-hold circuit includes an integrator 87, 89 connected to the input lead 41 from the filter 39 for integrating the error signal, a holding capacitor 91, 93 for sampling the integrated error signal, a sampling switch 95, 97 connecting the integrator to the holding capacitor and open momentarily at the beginning of the respective half-cycle of the reference a-c signal, a reset switch 99, 101 connecting the input and the output of the integrator and closed momentarily following closing and opening of the sampling switch for resetting the integrator, and an FET switch 103, 105 connected to the input of the integrator for gating the error signal to the integrator during the respective half-cycle of the reference a-c signal. The phase detector 35 further includes two control circuits 107, 109 which alternately activate the sampling and reset switches of the respective sample-and-hold circuits. The inputs of the control circuits 107, 109 are connected through a phase adjustable amplifier 111 which takes the reference a-c signal from the grounded secondary winding 19 of the transformer, adjusts its phase to compensate for shifts arising in transmission, and amplifies the same. Each control circuit includes a voltage comparator 113, 115 for indicating when the reference signal exceeds a negative or positive voltage level respectively, and two one-shots 117, 119, and 121, 123 in cascade which are triggered in succession by a non-zero output from the voltage comparator, and control the sampling switch and the reset switch respectively. The voltage comparator is essentially a modified differential amplifier with two stable states, responding when an applied output voltage crosses a pre-established threshold level. Suitable voltage comparators, in the form of integrated circuits, may be purchased, for example, from National Semiconductor Corporation, Santa Clara, California. A third control circuit 97 is provided which includes two voltage comparators 125, 127 connected to the phase adjustable amplifier 111 and responsive to negative excursions of the reference a-c signal for alternately opening the FET switches 103, 105. The waveform for the output signal from the comparator 113 and the waveforms for the control input signals to the sampling 95, the reset switch 99 and the FET switch 103 are shown in FIGS. 3(b), 3(c), 3(d) and 3(e) respectively. The sampling switch 95 and the reset switch 99 are turned on when the waveforms are at the lower level. The waveform for the control input signal to the FET switch 105 is shown in FIG. 3(f). The waveforms of the input signals to the integrator 87 are exemplified by those shown in FIG. 3(g), 3(h), and 3(i) depending on the phase difference between the error signal and the reference signal. FIG. 3(h) illustrates the waveform obtained for the bridge balance condition. FIGS. 3(g) and 3(i) illustrate the waveforms for opposite directions of bridge imbalance.

Enclosed by a broken line in FIG. 2 are the circuit elements of the counter control unit 37 indicated in block form in FIG. 1. A scaler 129 is provided to gate square wave pulses at half the reference signal frequency from the comparator 127 to the clock input of the up-down counter 43. A comparator 131, 133 is connected to the holding capacitor 91, 93 of each of the sample-hold circuits and receives therefrom voltage signals proportional to the integral of the input signals to the integrator 87, 89. When the voltage across the holding capacitor 91 is more negative than the threshold set by the fixed voltage divider 135, the output of the comparator 131 goes high. The high output causes, through the control logic 137, the lead to the up-down control line of the counter 43 to go high, causing the counter to count in the forward direction (up), and enables the scaler 129 connected to the clock input of the counter. When the voltage across the holding capacitor 93 is more negative than the threshold set by the fixed voltage divider 135, the output of the comparator 133 goes high. The high output causes, through the control logic 137, the lead to the up-down control line of the counter 43 to go low, causing the counter to count in the reverse direction (down) and enables the scaler 129 connected at the clock input of the counter.

Obviously, numerous modifications and variations of the present invention are possible in light of the above teachings. It is therefore to be understood that within the scope of the appended claims, the invention may be practiced otherwise than as specifically described hrein.

What is claimed as new and desired to be secured by letters patent of the United States is:

1. An angle detector comprising:
   a capacitive pickup member;
   an inductive element suspended as a pendulum and angularly movable past the capacitive pickup element, the inductive element divisable into two parts $L_1$ and $L_2$ formed between the electrical center of the capacitive pickup element and the two ends of the inductive element in accordance with the angular displacement of the inductive element with respect to the capacitive pickup element;
   a digitally positionable potentiometer electrically shunting the inductive element to form the remaining two parts $R_1$ and $R_2$ of a bridge circuit;
   an alternating current source connected to the bridge circuit to provide an alternating current signal therein, no current flowing from the inductive element to the capacitive pickup element when the bridge circuit is balanced;
   means connected to the capacitive pickup element and responsive to the flow of current thereto from the inductive element for generating an error signal;
   a phase detector connected to the error signal generating means for detecting the phase difference between the error signal and the alternating current signal to indicate the phase difference; and
   means responsive to the indicating of the phase difference for digitally positioning the potentiometer to balance the bridge circuit and null the error signal.

2. The angle detector recited in claim 1 wherein the digitally positionable potentiometer includes:
   two networks having a plurality of binary weighted resistors and an equal plurality of digitally controllable switches for disconnecting selected ones of the plurality of resistors from the networks.

3. The angle detector recited in claim 1 wherein the positioning means includes:
   a binary counter whose outputs are connected to the control inputs of the digitally controllable switches.

4. The angle detector recited in claim 1 wherein the phase detector includes:
   sample means for sampling the error signal during half-cycles of the alternating current signal; and
   comparator means connected to the sample means for comparing the sampled error signal with a predetermined voltage level to indicate the phase difference between the error signal and the alternating current signal.

5. The angle detector recited in claim 1 wherein the sample means includes:
   an integrator connected to the error signal generating means;
   a holding capacitor connected to the output of the integrator; and
   switch means for permitting the capacitor to sample and hold the output of the integrator during half-cycles of the alternating current signal.

6. The angle detector recited in claim 3 including:

means for reading out the count of the binary counter, thereby directly indicating the angular displacement of the resistive element with respect to the capacitive pickup member.

7. The angle detector recited in claim 6 wherein the reading out means includes a recorder.

8. The angle detector recited in claim 6 wherein the reading out means includes a digital-to-analog converter.

9. The angle detector recited in claim 8 wherein the reading out means includes an analog offset circuit connected to the analog-to-digital converter to set the analog readout to zero at any point of operation of the binary counter.

* * * * *